(12) United States Patent
Baird et al.

(10) Patent No.: US 7,457,832 B2
(45) Date of Patent: Nov. 25, 2008

(54) VERIFYING DYNAMICALLY GENERATED OPERATIONS ON A DATA STORE

(75) Inventors: Justin Baird, Seattle, WA (US); Sander B. Bogdan, Redmond, WA (US); Jeffrey E. Reed, Lake Stevens, WA (US); James M. Stone, Sammamish, WA (US); Guang-an Wu, Sammamish, WA (US); David E. Sceppa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 10/931,075

(22) Filed: Aug. 31, 2004

(65) Prior Publication Data

US 2006/0047658 A1    Mar. 2, 2006

(51) Int. Cl.
*G06F 12/00* (2006.01)
*G06F 17/30* (2006.01)
*G06F 9/44* (2006.01)
*G06F 9/45* (2006.01)
*H04K 1/00* (2006.01)

(52) U.S. Cl. .............. 707/203; 717/126; 717/127; 717/130; 725/22; 705/75

(58) Field of Classification Search ............ 707/203
See application file for complete search history.

(56) References Cited

U.S. PATENT DOCUMENTS

| 5,193,180 | A | * | 3/1993 | Hastings ............... 717/163 |
| 5,305,448 | A | | 4/1994 | Insalaco et al. |
| 5,335,344 | A | * | 8/1994 | Hastings ............... 714/35 |
| 5,349,655 | A | * | 9/1994 | Mann ............... 714/6 |
| 5,404,499 | A | * | 4/1995 | Nichols ............... 714/54 |

(Continued)

FOREIGN PATENT DOCUMENTS

EP    0550368    7/1993

(Continued)

OTHER PUBLICATIONS

Tuovinen et al., "Translating SQL for Database Reengineering", Feb. 1996 ACM Sigplan Notice, vol. 31, No. 2, p. 21-26.*

(Continued)

*Primary Examiner*—Tim Vo
*Assistant Examiner*—Joseph D Wong
(74) *Attorney, Agent, or Firm*—Lee & Hayes, PLLC

(57) ABSTRACT

Verifying dynamically generated operations on a data store includes carrying out setup actions for access to the data store, the setup actions being based at least in part on a request for which the dynamically generated operations will be generated. The carrying out of setup actions includes permissions being set for portions of the data store to establish a restricted portion of the data store and an unrestricted portion of the data store, as well as using one or more additional techniques to check whether any unexpected changes were made to the unrestricted portion or to lock access to parts of the unrestricted portion. After the dynamically generated operations are performed, a verification is made that no unexpected work was performed by the dynamically generated operations. If unexpected work was performed then the operations are determined to be not correct for the request.

29 Claims, 6 Drawing Sheets

U.S. PATENT DOCUMENTS

| | | | |
|---|---|---|---|
| 5,440,723 A | | 8/1995 | Arnold et al. |
| 5,440,735 A * | | 8/1995 | Goldring ................... 707/8 |
| 5,535,329 A * | | 7/1996 | Hastings ................... 714/35 |
| 5,537,540 A * | | 7/1996 | Miller et al. ............... 714/38 |
| 5,668,999 A * | | 9/1997 | Gosling .................... 717/126 |
| 5,717,911 A * | | 2/1998 | Madrid et al. .............. 707/2 |
| 5,812,828 A * | | 9/1998 | Kaufer et al. .............. 703/22 |
| 5,907,709 A * | | 5/1999 | Cantey et al. ............... 717/141 |
| 5,930,795 A | | 7/1999 | Chen et al. |
| 5,987,557 A | | 11/1999 | Ebrahim |
| 6,560,774 B1 * | | 5/2003 | Gordon et al. ............... 717/146 |
| 6,693,912 B1 * | | 2/2004 | Wang ........................ 370/401 |
| 6,721,941 B1 * | | 4/2004 | Morshed et al. ............. 717/127 |
| 6,725,240 B1 | | 4/2004 | Asad et al. |
| 6,760,903 B1 * | | 7/2004 | Morshed et al. ............. 717/130 |
| 6,981,245 B1 * | | 12/2005 | Schwabe .................... 717/126 |
| 7,111,307 B1 * | | 9/2006 | Wang ........................ 719/321 |
| 7,127,607 B1 * | | 10/2006 | Su et al. ................... 713/156 |
| 7,194,475 B2 * | | 3/2007 | DelMonaco et al. ........ 707/102 |
| 7,237,076 B2 * | | 6/2007 | Nakano et al. .............. 711/162 |
| 7,249,133 B2 * | | 7/2007 | Lou et al. .................. 707/100 |
| 7,257,587 B2 * | | 8/2007 | Fitzpatrick et al. .......... 707/100 |
| 2003/0023609 A1 * | | 1/2003 | Della-Libera et al. ....... 707/101 |
| 2003/0188184 A1 | | 10/2003 | Strongin et al. |
| 2004/0068489 A1 | | 4/2004 | Dettinger et al. |
| 2004/0111613 A1 * | | 6/2004 | Shen-Orr et al. ............ 713/165 |
| 2004/0217985 A9 * | | 11/2004 | Ries et al. .................. 345/740 |
| 2004/0220932 A1 * | | 11/2004 | Seeger et al. ............... 707/8 |
| 2004/0225459 A1 * | | 11/2004 | Krishnaswamy et al. ...... 702/57 |
| 2005/0050046 A1 * | | 3/2005 | Puz et al. ................... 707/9 |
| 2005/0131870 A1 * | | 6/2005 | Krishnaswamy et al. ....... 707/3 |
| 2006/0206507 A1 * | | 9/2006 | Dahbour .................... 707/100 |

FOREIGN PATENT DOCUMENTS

WO     WO02065285     8/2002

OTHER PUBLICATIONS

Bennett et al., "Check on Access Via Hierarchical Block Validation", IBM TDB, Dec. 1984, IP.com, p. 1-3.*

Rosenberg, "How Debuggers Work: Algorithms, Data Structures, and Architecture", Sep. 27, 1996, Wiley Computer Publishing, p. 7, 23-27, 30-32, 44, 45, 47, 48, 60, 74, 103, 110-111, 116-117, 120, 130, 136, 142, 148, 154, 155, 164, 177, 178, 179, 191-193, 200-202, 229-232, 242.*

Rational Software Corp., "Purify User's Guide", Apr. 5, 1999, Rational Software, p. xi-xiii, 2-12, 2-13, 2-14, 2-15, 3-2, 3-8, 3-11, 335-338.*

Maloy, Paradox for Windows Quick Reference, Dec. 1993, Que Corporation, 4th Printing, p. ii-iii, v, 6-8, 24-27, 32-33, 34-35, 36-37, 54-61, 116-119, 122-125, 148-149.*

Gupta et al., Validating and Verifying Knowledge-based Systems, Dec. 1991, IEEE Press, p. 105-117.*

Necula, "Proof-Carrying Code", POPL'97, 1997, ACM Press, p. 106-119.*

Microsoft, "Using Driver Verifier to Expose Driver Errors", Mar. 17, 1999, <Retrieved from www.microsoft.com/hwdev/driver/driververify.htm>, p. 1-8.*

"SQL Test Suite Goes Online", Sullivan, J., IEEE Computer Society, Computer, vol. 30, No. 6, Jun. 1997, pp. 103 and 105.

"Testability analysis utilizing a relational database", Fenton, W.H., IEEE, 1996, pp. 149-155.

"A New Language for Automatic Data Generation", Szabo et al., Proceedings of Third International Conference of the ACPC Parallel Databases and Parallel I/O, Sep. 23-25, 1996, pp. 221-222.

"Efficient database updates with independent schemes", Torlone et al., SIAM Journal on Computing, vol. 28, No. 3, Mar. 19, 1999, pp. 1112-1135.

"Verification, validation, and integrity issues in expert and database systems: two perspectives", Coenen et al., International Journal of Intelligent Systems, vol. 16, No. 3, Mar. 2001, pp. 425-447.

Carnegie Mellon University: "Selecting audit events for Windows NT 4.0 registry Keys" Cert: Mar. 17, 1999 XP002185674 "the whole document".

Gavrila Martau: "Total Uninstall 2.30" Online! Dec. 25, 2003, pp. 1-1, XP002357115 Retrived from the Internet: URL http://web.archive.org/web/20031225091432/http://www.soft32.com/download_102.html>'retrived on Dec. 1, 2005. The whole document.

Hector et al. "Database System Implementation" 200, Prentice hall, USA, XP002357126 ISBN: 0-13-040264-8 Chapters 8 and 9 p. 423-540.

Ruiz et al; "A strategy for testing metaobject protocols in reflective architecture" Jul. 1, 2001, Proceedings International confernce on dependable systems an networks. DSN 2001. G Teborg. Sweden, Jul. 1-4, 2001, International confernce on dependable systems and networks, Los Alamitos, CA: XP001042422 ISBN: 0-7695-1101-5 p. 328, left-hand column, line 12-line 14 p. 328, left-hand column, line 37-right hand column, line 22, p. 331, left-hand column, paragraph 3.3.

* cited by examiner

_US 7,457,832 B2_

VERIFYING DYNAMICALLY GENERATED OPERATIONS ON A DATA STORE

TECHNICAL FIELD

This invention relates to testing and verification, and particularly to verifying dynamically generated operations on a data store.

BACKGROUND

As computer technology has advanced, the capacity of storage devices has increased. One or more such storage devices can be viewed as a data store, and different techniques have been developed to maintain and access the large amounts of data that can be included in a data store. As the techniques used to access the data can be rather detailed and can vary over time, products are being developed that abstract the details of accessing the data. Such abstraction products can then be leveraged by an application developer in order to access the stored data. Thus, the application developer can interact with an easier-to-use interface of the abstraction product, and rely on the abstraction product to understand the details of accessing the storage device.

Typically, these abstraction products convert requests or instructions received from an application in one format to another format that is understood by the data store. For example, a request from the application (e.g., in a programming language) to change a particular data value may be converted by the abstraction product into a series of operations (e.g., a series of SQL statements) that locate a part of the data store, and then write new data over that part of the data store.

One problem that can be encountered with such abstraction products is that care must be taken to ensure that the conversion is done correctly. If the conversion is done incorrectly, then the result of the application's request may not be accurate, and the abstraction product cannot be relied on for accurate operation. One way in which this problem could be solved is to test the abstraction product by analyzing the operations or instructions that are generated by the abstraction product and determining whether those operations or instructions are accurate given the request received by the abstraction product. However, in reality such analysis and determination can be very difficult, especially in light of the fact that the format of the operations or instructions that are generated by the abstraction product, as well as the particular operations and instructions themselves, can be continually changing. Thus, it would be beneficial to have a better way to verify that an abstraction product is converting received requests and commands correctly.

SUMMARY

Verifying dynamically generated operations on a data store is described herein.

In accordance with certain aspects, permissions are set on a data store to allow access to only an unrestricted portion of the data store. The unrestricted portion of the data store excludes a first portion of the data store that should not be accessed by one or more operations on the data store that are dynamically generated for a request. After the one or more operations on the data store are performed, a check is made as to whether any unexpected changes were made to the unrestricted portion.

In accordance with other aspects, permissions are set on a data store to allow access to only an unrestricted portion of the data store. The unrestricted portion of the data store excludes a first portion of the data store that should not be accessed by one or more operations on the data store that are dynamically generated for a request. Additionally, access to a part of the data store that should not be accessed by the one or more operations is locked, the part of the data store being included in the unrestricted portion.

BRIEF DESCRIPTION OF THE DRAWINGS

The same numbers are used throughout the document to reference like components and/or features.

DETAILED DESCRIPTION

Verifying dynamically generated operations on a data store is described herein. When a request is made that involves access to a data store, one or more operations are dynamically generated on behalf of the requester, and these one or more operations are sent to the data store which carries out the operations. A check is made as to whether the work that was expected to be performed on the data store in light of the request has been performed, and further that no work that was not expected to be performed on the data store in light of the request has been performed. If these checks indicate that the expected work was performed and that no unexpected work was performed, then the dynamically generated operations are verified as being accurate for the request. A variety of different techniques can be used to verify that no unexpected work was performed on the data store.

Figure 1:
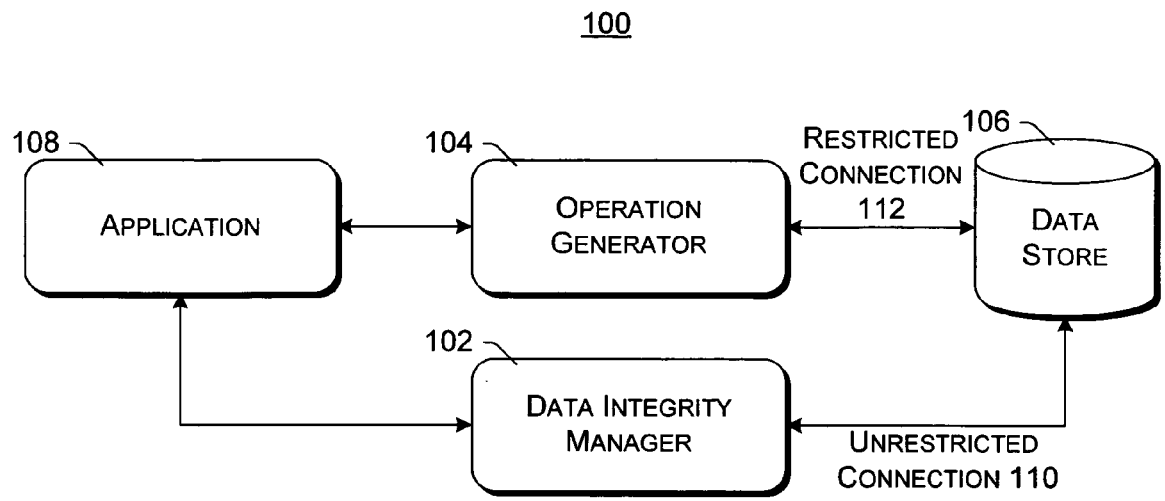
FIG. 1 is a block diagram illustrating an example environment in which the verifying dynamically generated operations on a data store can be performed.

FIG. 1 is a block diagram illustrating an example environment 100 in which the verifying dynamically generated operations on a data store can be performed. Environment 100 includes a data integrity manager 102, an operation generator 104, a data store 106, and an application 108.

Data store 106 can be any system that stores data. For example, data store 106 can be a database (e.g., a relational database or non-relational database), such as a Microsoft® SQL server database. Data store 106 could alternatively be any other type of structured and persisted memory by which an application could use that memory to query, insert, update, or delete its data contents, such as an eXtensible Markup Language (XML) document, a file system, etc.

Operation generator 104 is an abstraction component that operates as an intermediary between application 108 and data store 106. Requests to access data store 106 are made by application 108 to operation generator 104, which in turn dynamically generates one or more operations to be performed on data store 106. Because these operations are generated by operation generator 104 based on the particular requests received from application 108, the operations are viewed as being generated dynamically. The requests made by application 108 can include, for example, requests to retrieve data from data store 106, requests to modify data in data store 106, requests to add data to data store 106, and requests to delete data from data store 106. The operations dynamically generated by operation generator 104 can be generated in any of a variety of conventional manners and will depend at least in part on the particular request received from application 108 and the nature or type of storage provided by data store 106. The operations dynamically generated by operation generator 108 can be queries, data manipulation statements, requests, commands, instructions, etc. For example, the operations dynamically generated by operation generator 108 can include operations to read data from data store 106, operations to write data to data store 106, operations to create new entries for data in data store 106 (e.g., create new rows in a table of a database), and operations to delete entries for data in data store 106 (e.g., delete rows from a table of a database).

Application 108 can be any of a variety of different applications (e.g., computer programs) that access data store 106. Additionally, although only a single application 108 is illustrated in FIG. 1, it should be noted that multiple applications may access data store 106 by way of operation generator 104. In certain embodiments, application 108 is a test application that is designed to test operation generator 104, submitting various requests to operation generator 104 so that the behavior of generator 104 in dynamically generating operations can be verified. In other embodiments, application 108 may be a non-test application, but use data integrity manager 102 to verify that operation generator 104 is functioning properly.

In certain embodiments, each component or module, such as operation generator 104 or data integrity manager 102, that accesses data store 106 does so by way of a connection. The component or module logs in to data store 106 over this connection. An operation generator 104 logs in to data store 106 as a particular user (this may refer to a human user, or simply some identifier), and may log in to data store 106 multiple times concurrently. The connection has a set of rights or permissions associated with it that identify what the component using that connection is permitted to do at data store 106. For example, a component may be permitted to access only certain portions of data store 106, or may be permitted to read from but not write to data store 106. The component or module communicates with data store 106 over this connection, but only operations which satisfy the restrictions of the connection will be carried out by data store 106.

Data integrity manager 102 uses an unrestricted connection 110 to data store 106. Data integrity manager 102 is not prohibited from performing any operation on data store 106. Operation generator 104, on the other hand, uses a restricted connection 112 to data store 106. Based on the particular request that has been submitted by application 108, operation generator 104 is prohibited from performing certain operations on data store 106. Data integrity manager 102 sets these restrictions on restricted connection 112, as discussed in more detail below.

Figure 2:
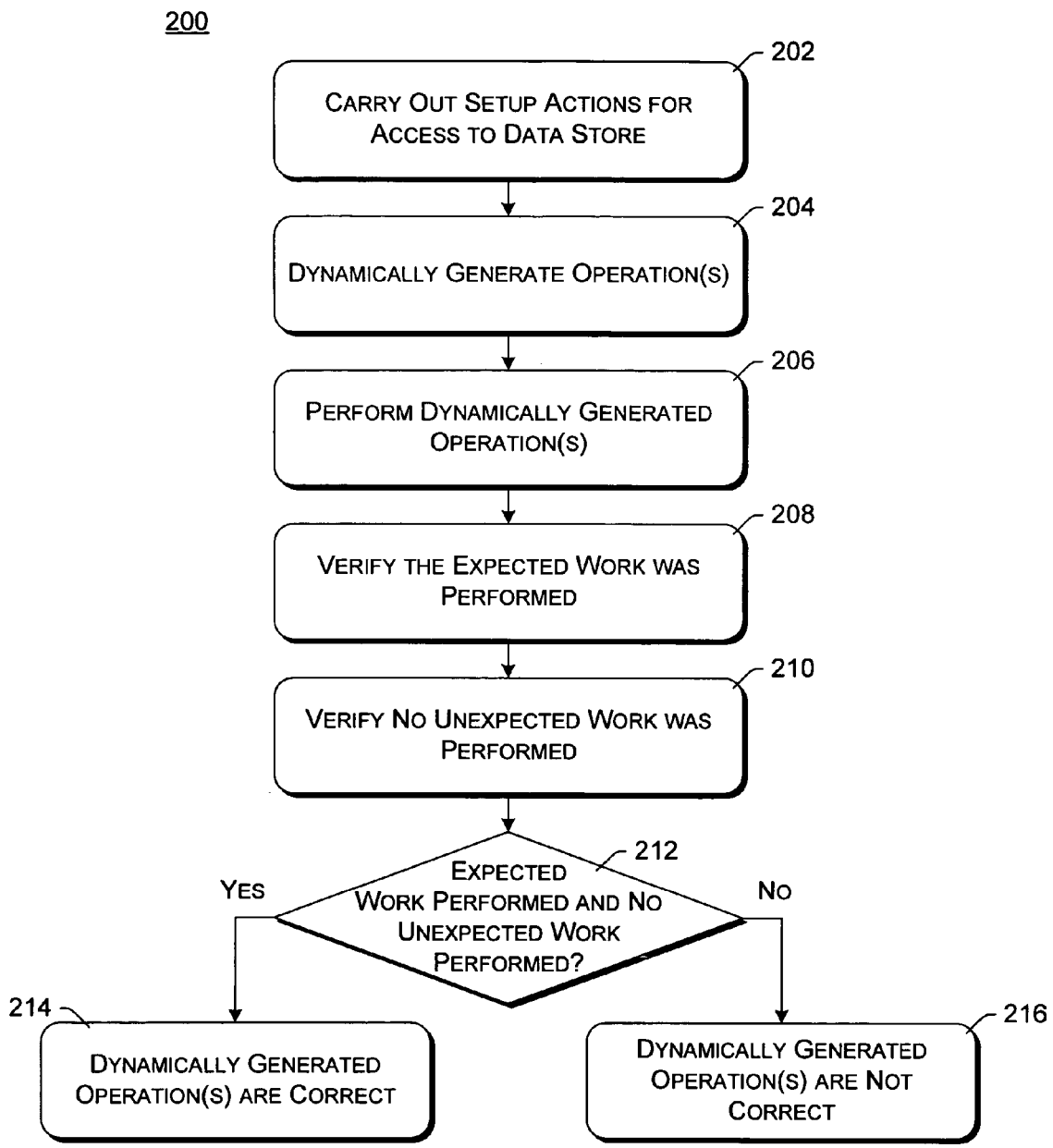
FIG. 2 is a flowchart illustrating an example process for verifying dynamically generated operations on a data store.

FIG. 2 is a flowchart illustrating an example process 200 for verifying dynamically generated operations on a data store. Process 200 may be performed in software, firmware, hardware, or combinations thereof. FIG. 2 is discussed with reference to the components of environment 100 of FIG. 1.

Process 200 is repeated for each of multiple requests (e.g., all requests) to be submitted to operation generator 104 by application 108.

Initially, setup actions for access to data store 106 are carried out (act 202). If restricted connection 112 does not already exist, then it is created in act 202. As discussed in more detail below, these setup actions can include, for example, granting or denying of particular permissions and setting such permissions on restricted connection 112, allowing subsequent checks for unexpected changes to the data store (e.g., by taking snapshots of parts of data store 106), locking parts of data store 106, and so forth. The particular setup actions to be carried out are identified to data integrity manager 102 by application 108. Application 108 is aware of the particular request that is going to be submitted to operation generator 104, and thus is able to identify particular setup actions to be carried out by generator 104 when accessing data store 106 to carry out the request. For example, if application 108 is a test program to verify the behavior of data integrity manager 102, application 108 will typically be designed to have the knowledge of what setup actions should be carried out by generator 104. By way of another example, if application 108 is not a test program, application 108 may still have some knowledge of what setup actions should be carried out by generator 104 (e.g., if application 108 includes one part where a user can add items to his or her shopping cart and another where the user can pay for the items in the shopping cart, application 108 can know that any billing information such as credit card numbers in data store 106 should not be accessed by requests involving adding items to or deleting items from the shopping cart).

Optionally, after the desired setup actions have been carried out, data integrity manager 102 can return an indication to application 108 that the setup actions have been carried out, thereby notifying application 108 that it can submit its request to operation generator 104.

Once the setup actions are carried out, the operation generator 104 dynamically generates the appropriate operations(s) based on the request received from application 108 (act 204), and performs the dynamically generated operation(s) on data store 106 (act 206).

Application 108 then verifies that the expected work was performed (act 208). This verification in act 208 can be performed in any of a variety of conventional manners. Application 108 knows what the request was, and thus what should have been changed in data store 106 (if anything), so it can submit an additional request(s) to verify that the desired change has been made. For example, if the request was to add data to data store 106, then application 108 can attempt to retrieve the data that should have been added, and if it retrieves that data then application 108 knows that the expected work was performed.

Data integrity manager 102 also verifies that no unexpected work was performed (act 210). This verification, as discussed in more detail below, can be based on an analysis of what changes were made to data store 106, whether an attempt was made to access locked data, whether an attempt was made to access data to which permission was denied, and so forth. The results of this verification can optionally be returned to application 108. Alternatively, the information gathered by data integrity manager 102 (e.g., the snapshots discussed in more detail below) may be returned to application 108 for application 108 to verify that no unexpected work was performed.

Whether the dynamically generated operation(s) are verified as being correct depends on the verifications in acts 208 and 210 (act 212). If it is verified that the expected work was performed, and it is verified that no unexpected work was performed, then the dynamically generated operation(s) are verified as being correct (act 214). However, if it is not verified that the expected work was performed, and/or it is not verified that no unexpected work was performed, then the dynamically generated operation(s) are not verified as being correct (act 216).

Figure 3:
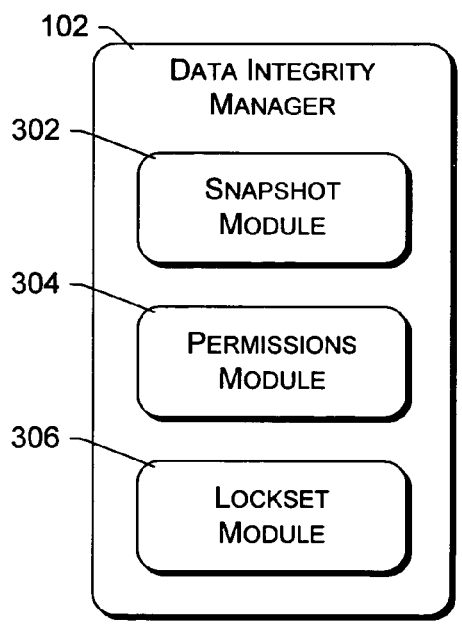
FIG. 3 illustrates an example data integrity manager in additional detail.

FIG. 3 illustrates an example data integrity manager 102 in additional detail. Data integrity manager 102 includes a snapshot module 302, a permissions module 304, and a lockset module 306. Permissions module 304 sets permissions so that only certain portions of data store 106 can be accessed. Based on these permissions, those portions of data store 106 that can be accessed are referred to as the unrestricted portion of data store 106, and those portions of data store that cannot be accessed are referred to as the restricted portion of data store 106. Snapshot module 302 checks whether any unexpected changes are made to the unrestricted portion of data store 106. Lockset module 306 locks parts of the unrestricted portion of data store 106 so that those locked parts cannot be accessed by operation generator 104. The behavior of modules 302, 304, and 306 is discussed in more detail below.

It should be noted that certain embodiments may not include each of snapshot module 302, permissions module 304, and lockset module 306. Which of these modules are included in a particular data integrity manager 102 can vary based on the desires of the designer of manager 102, as well as the functionality supported by data store 106. For example, if data store 106 supports no mechanism to allow parts of data store 106 to be locked or otherwise made temporarily inaccessible, then lockset module 306 may not be included in data integrity manager 102. By way of another example, if the designer of manager 102 does not desire to make use of any permissions supported by data store 106 (or if data store 106 does not support permissions), then permissions module 304 need not be included in data integrity manager 102.

Permissions module 304 sets permissions for access to data store 106. Data store 106 allows permission to different portions of data store 106 to be granted and/or denied, and these permissions are associated with a particular connection. So, data integrity manager 102 can set permissions for restricted connection 112 to restrict which portions of data store 106 can be accessed by operation generator 104 over restricted connection 112. Operation generator 104 can access the unrestricted portion, but cannot access the restricted portion. Different permissions can be set for different connections to data store 106 (e.g., multiple restricted connections 112 may be used by operation generator 104 to communicate with data store 106, and each of these multiple restricted connections can have different permission settings).

The granularity at which permissions can be used to define the restricted and unrestricted portions of data store 106 can vary based on the particular data store. The permissions may be set, for example, on a table level, column level, row level, page level, line level, and so forth. In certain embodiments, where data store 106 is a Microsoft® SQL server database, data store 106 allows permissions to be set on either a column level or a table level. A Microsoft® SQL server database is typically made up of multiple tables, each of which can have multiple rows and multiple columns. If the permissions are set at a table level, then data store 106 allows permission to access a particular table to be granted or denied. If the permissions are set at the column level, then data store 106 allows permission to access a particular column of a particular table to be granted or denied. In a Microsoft® SQL server database, operations to create rows in a table and operations to delete rows from a table are set at the table level, and operations to update data in a table and operations to read data from a table are set at the column level.

If an operation dynamically generated by operation generator 104 attempts to access the restricted portion of data store 106, data store 106 can return an indication to operation generator 104 (or alternatively data integrity manager 102) that an attempt was made to access the restricted portion. Alternatively, data store 106 may simply not perform the operation and after a particular amount of time (referred to as a timeout period), operation generator 104 will assume that a problem occurred with the operation. Based on the indication received from data store 106, or the timeout period elapsing, an indication that an attempt to access the restricted portion was made can be reported back to application 108, thereby informing application 108 that there is a problem with one or more of the operations dynamically generated by operation generator 104.

The behavior of permission module 304 can be seen from the following example. Assume that data store 106 includes three tables: a customer table storing information regarding customers, an order table storing information regarding orders that have been placed, and a payment table storing payment information (e.g., credit card numbers). Further assume that application 108 is going to send a request to operation generator 104 to add a customer (e.g., name, address, telephone number, etc.) in the customer table, and that application 108 informs data integrity manager 102 (e.g., as part of the establishing act 202 of FIG. 2) that this request to add the customer to the customer table will not need access to the order table or the payment table. Data integrity manager 102 can thus set permissions on restricted connection 112 so that access to the order table and the payment table is denied, but access to the customer table is granted. Thus, when operation generator 104 dynamically generates operation(s) to add the customer as indicated in the request to change the name by application 108, if any of the operations generated by generator 104 attempt to access either the order table or the payment table, data store 106 will not allow the access to be performed. Data store 106 can return an indication to operation generator 104 (or alternatively data integrity manager 102) that an attempt was made to access a table for which permission was denied, or data store 106 may simply not perform the operation and after a timeout period elapses operation generator 104 will assume that a problem occurred with the operation.

The granting and denying of permissions, however, cannot always detect improper operations. For example, continuing with the previous example, assume that the operations dynamically generated by operation generator 104 also delete a customer from the customer table. Because operation generator 104 has permission to access the customer table, the permissions will not prohibit this incorrect deletion from occurring.

Snapshot module 302 checks whether any unexpected changes are made to the unrestricted portion of data store 106. Snapshot module 302 does not need to check whether any unexpected changes are made to the restricted portion of data store 106 because it can rely on permissions having already been set to prevent any changes from being made to the restricted portion of data store 106. Alternatively, snapshot module 302 may check whether any unexpected changes are made to additional areas of data store 106 rather than just the unrestricted portion. In addition, it should be noted that the unrestricted portion of data store 106 may be all of data store 106 (e.g., in embodiments where there is no permission module 304, the entire data store 106 can be viewed as the unrestricted portion).

Application 108 informs data integrity manager 102 of what changes to data store 106 are expected, allowing snapshot module 302 to check whether any unexpected changes are made to the unrestricted portion. Alternatively, an indication of what changes are made to the unrestricted portion may be returned by snapshot module 302 to application 108 so that application 108 can determine whether any unexpected changes are made to the unrestricted portion.

Snapshot module 302 can check whether any unexpected changes are made to the unrestricted portion of data store 106 in a variety of different ways. In certain embodiments, snapshot module 302 takes a snapshot of all parts of the unrestricted portion of data store 106 that are not expected to be changed by the dynamically generated operations. This snapshot is taken, for example, as part of the establishing in act 202 of FIG. 2. This snapshot can also be referred to as a "pre-performance" or "before" snapshot because it is taken before the dynamically generated operations are performed. Those parts of the unrestricted portion of data store 106 that are not expected to be changed by the dynamically generated operations are identified, for example, by application 108. Because application 108 knows what the request is that will be submitted, application 108 also has knowledge about what should and should not happen in data store 106, and this knowledge can be passed to data integrity manager 102. For example, if a new row in a table is to be created (e.g., for a new customer in a customer table), then no existing row in that table should be changed by the dynamically generated operations. By way of another example, if a row in a table is to be deleted (e.g., removing a customer from a customer table), then no row except for that row to be deleted should be changed by the dynamically generated operations. It should be noted that the knowledge application 108 has about what should and should not happen in data store 106 is typically characterized in terms of what is not needed for a particular request. For example, if application 108 knows that the request should only affect two rows in a table, then application 108 can recite those two rows and indicate that no other rows should be changed, rather than reciting the potentially thousands of rows that should not be changed.

The snapshot of the parts of the unrestricted portion of data store 106 that are not expected to be changed by the dynamically generated operations can be taken in different manners. In certain implementations, the snapshot is taken by copying or otherwise capturing all of the data in parts of the unrestricted portion of data store 106 that are not expected to be changed by the dynamically generated operations. In other implementations, the snapshot is taken by calculating a hash value (using a conventional hash function) over the parts of the unrestricted portion of data store 106 that are not expected to be changed by the dynamically generated operations.

In other implementations, the snapshot is taken by copying or otherwise capturing a version number for different parts of the unrestricted portion of data store 106. For example, in embodiments where data store 106 is a database having one or more tables, a column of version values may be included in the table. The version value for a particular row of the database is changed by the database each time data in that particular row is changed. The version value may be, for example, a value that is expected to be unique in the database, such as a Globally Unique Identifier (GUID), a date and time stamp (e.g., measuring time in nanoseconds), a hash value resulting from applying a hash function to the data in the row, and so forth. If such a column of version values is not already in the table, then data integrity manager 102 can create that column in the table (e.g., as part of establishing act 202 of FIG. 2.).

In addition to copying or otherwise capturing a version number for different parts of the unrestricted portion of data store 106, in certain embodiments an indicator of which part that version number is for may also be copied or otherwise captured. For example, in embodiments where data store 106 includes a table having a column of version values, another column may include identifiers (e.g., primary key values) that uniquely identify rows of the table. The snapshot can thus maintain an association between version numbers and particular rows of the table. By having these additional identifiers that allow an association between version numbers and particular rows of the table, it is possible to more accurately identify the nature of any changes that are detected as discussed in more detail below.

After the snapshot of the parts of the unrestricted portion of data store 106 that are not expected to be changed by the dynamically generated operations has been taken, the dynamically generated operations can be performed. After the dynamically generated operations are performed, another snapshot of the parts of the unrestricted portion of data store 106 that are not expected to be changed by the dynamically generated operations is taken. This second snapshot is taken in the same manner as the pre-performance snapshot as discussed above. This second snapshot is taken, for example, as part of the verification in act 210 of FIG. 2. This second snapshot can also be referred to as a "post-performance" or "after" snapshot because it is taken after the dynamically generated operations are performed. It should be noted that this second snapshot is taken of the parts of the unrestricted portion of data store 106 that are not expected to be changed by the dynamically generated operations, and not necessarily the same parts as the pre-performance snapshot was taken of. Thus, for example, if any new rows were added to a table in the unrestricted portion other than rows that were expected to be added by the dynamically generated operations, then the post-performance snapshot taken would include these new rows.

If there are any changes to the parts of the unrestricted portion of data store 106 that are not expected to be changed by the dynamically generated operations, then those changes should be reflected in the snapshots. For example, any data (e.g., rows of a table) that was added to the unrestricted portion of the data store not expected to be changed, any data that was deleted from the unrestricted portion of the data store not expected to be changed, and any data that was modified in the unrestricted portion of the data store not expected to be changed, would be reflected in the snapshots. So, if both of the pre-performance snapshot and the post-performance snapshot are the same (i.e., identical values, whether the values are all of the data in parts of the unrestricted portion of data store 106 that are not expected to be changed by the dynamically generated operations, or hash values, or version values, etc.), then no changes were made to the parts of the unrestricted portion of data store 106 that are not expected to be changed by the dynamically generated operations.

Depending on the manner in which the snapshots are taken, the particular part of the unrestricted portion of data store 106 that is not expected to be changed by the dynamically generated operations but that is changed may be identified. For example, if identifiers such as primary key values are copied or otherwise captured as part of the snapshot, then if a particular version number is different in the pre-performance and post-performance snapshot, then snapshot module 302 knows which row (based on the identifiers) of the table was changed.

By having the additional identifiers that allow an association between version numbers and particular rows of the table (e.g., primary key values), it is possible to more accurately identify the nature of any changes that are detected. For example, if the version value changed but the identifier of the row remained the same, then there was a modification to the data in the row. By way of another example, if a new row identifier is present in the post-performance snapshot that was not present in the pre-performance snapshot, then the row identified by that new row identifier is a new row that was added to the table. By way of yet another example, if a row identifier is present in the pre-performance snapshot but not in the post-performance snapshot, then the row identified by that row identifier is a row that was deleted from the table.

In other embodiments, rather than taking a snapshot of parts of data store 106, snapshot module 302 uses triggers to determine if any unexpected changes are made to the unrestricted portion of data store 106. Triggers are a mechanism supported by some data stores 106 that allow snapshot module 302 to request that it be notified by data store 106 of each change made to a particular table (or other unit) of data store 106. Such changes can include, for example, data being added to a particular table, data being deleted from a particular table, and data being updated in a particular table. Snapshot module 302 maintains a record of these changes (e.g., a table listing the changes) it is notified of by data store 106, and then evaluates that record after the dynamically generated operations are performed (e.g., as part of verification act 210 of FIG. 2). Alternatively, the record of changes (e.g., a table listing the changes) may be maintained by data store 106, and this record accessed by snapshot module 302.

If any changes are included in that record of changes that are not what application 108 informed data integrity manager 102 were expected, then snapshot module 302 knows that an unexpected change(s) was made to the unrestricted portion of data store 106 by the dynamically generated operations. If the only changes included in that record are those that application 108 informed data integrity manager 102 were expected, then snapshot module 302 knows that no unexpected changes were made to the unrestricted portion of data store 106 by the dynamically generated operations.

In certain embodiments, permissions module 304 and snapshot module 302 are used to verify that no unexpected work was performed for requests from application 108 that involve modifying data store 106, such as creating entries (e.g., rows, columns, tables, pages, lines, blocks, etc.) in data store 106, updating entries in data store 106, and/or deleting entries in data store 106. Permissions module 304 and lockset module 306 are used to verify that no unexpected work was performed for requests from application 108 that involve reading entries from data store 106, as discussed in more detail below.

Figure 4:
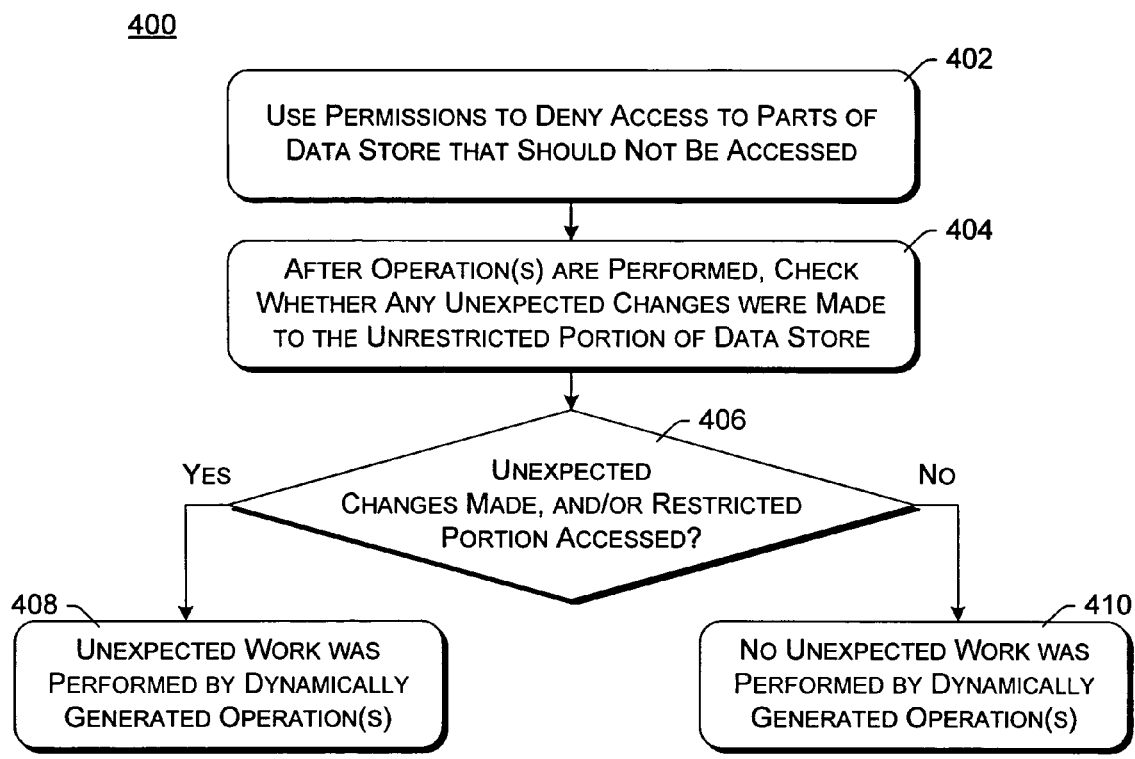
FIG. 4 is a flowchart illustrating an example process for verifying that no unexpected work was performed by dynamically generated operations.

FIG. 4 is a flowchart illustrating an example process 400 for verifying that no unexpected work was performed by dynamically generated operations. Process 400 is an example of a process that can be performed as the carrying out of setup actions act 202 and/or verification act 210 of FIG. 2. Process 400 may be performed in software, firmware, hardware, or combinations thereof.

Initially, permissions are used to deny access to parts of the data store that should not be accessed (act 402). These permissions are set, for example, by permissions module 304 of FIG. 3 as discussed above. After the dynamically generated operation(s) are performed, a check is made as to whether any unexpected changes were made by the dynamically generated operation(s) to unrestricted parts of the data store (act 404). This check is made, for example, by snapshot module 302 of FIG. 3 as discussed above. The results of this check can be returned, for example, to application 108.

Process 400 then proceeds based on whether the dynamically generated operation(s) made any unexpected changes to the unrestricted portions of the data store or accessed a restricted portion of the data store (act 406). Whether any unexpected changes to the unrestricted portions of the data store were made is determined from the results of the check in act 404. Whether any access to a restricted portion of the data store was attempted is performed based on the permissions set by permissions module 304 as discussed above.

If the dynamically generated operation(s) made any unexpected changes to the unrestricted portions of the data store and/or accessed a restricted portion of the data store, then unexpected work was performed by the dynamically generated operation(s) (act 408). Optionally, an indication of what work was performed may be returned to application 108 of FIG. 1, or alternatively simply an indication that some unexpected work was performed may be returned to application 108. However, if the dynamically generated operation(s) did not make any unexpected changes to the unrestricted portions of the data store and did not access a restricted portion of the data store, then it is verified that no unexpected work was performed by the dynamically generated operation(s) (act 410). This verification can optionally be returned to application 108.

Figure 5:
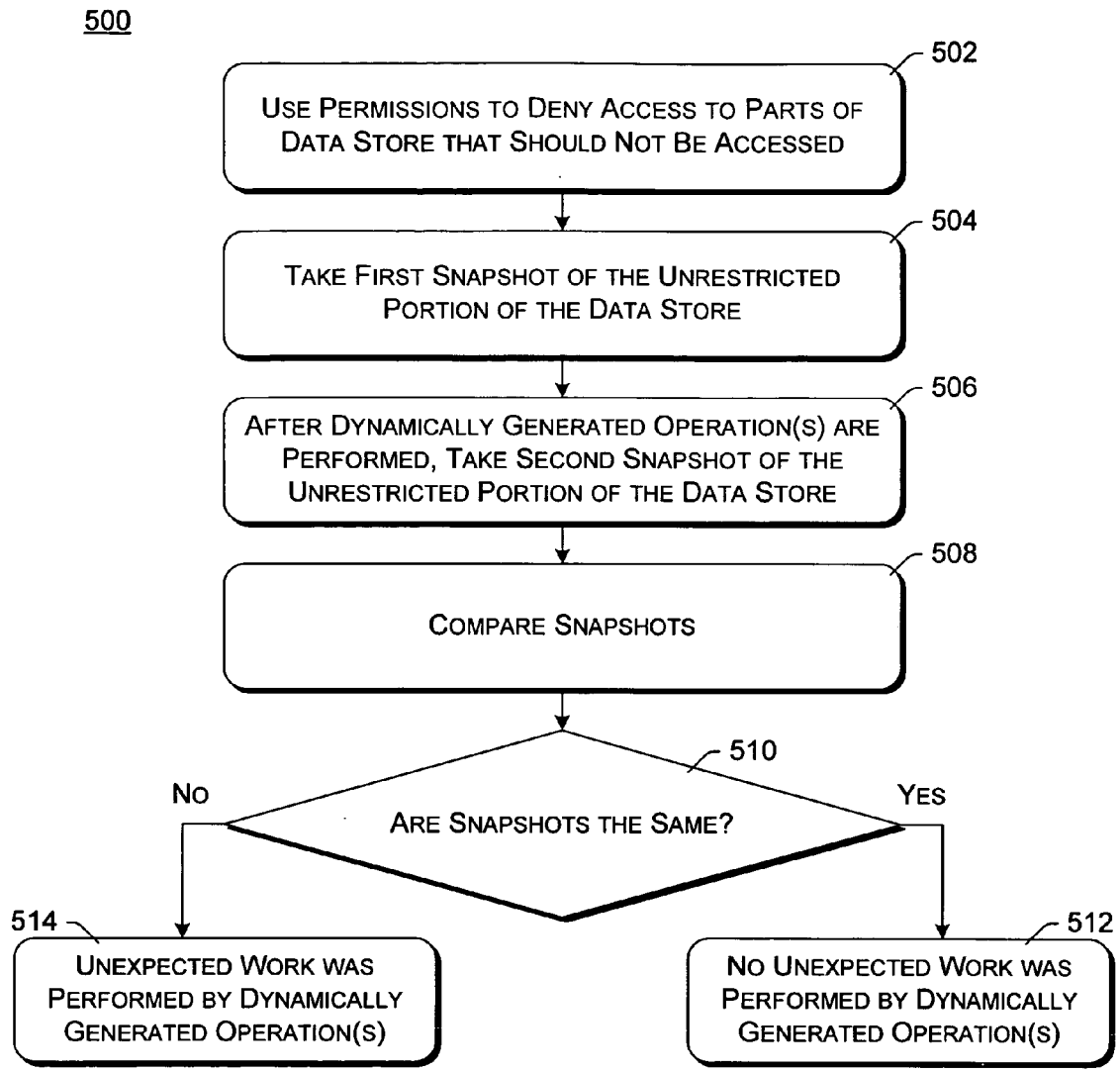
FIG. 5 is a flowchart illustrating another example process for verifying that no unexpected work was performed by dynamically generated operations.

FIG. 5 is a flowchart illustrating another example process 500 for verifying that no unexpected work was performed by dynamically generated operations. Process 500 is an example of a process that can be performed as the carrying out of setup actions act 202 and/or verification act 210 of FIG. 2. Process 500 may be performed in software, firmware, hardware, or combinations thereof.

Initially, permissions are used to deny access to parts of the data store that should not be accessed (act 502). These permissions are set, for example, by permissions module 304 of FIG. 3 as discussed above. A first snapshot of the unrestricted portion of the data store is then taken (act 504). This snapshot can be taken in any of a variety of manners, as discussed above with respect to snapshot module 302. After the dynamically generated operation(s) are performed, a second snapshot of the unrestricted portion of the data store is taken (act 506). This second snapshot is taken in the same manner as the first snapshot was taken in act 504.

The first and second snapshots are then compared (act 508), and process 500 proceeds based on whether the two snapshots are the same (act 510). If the two snapshots are the same (e.g., identical values, whether the values are all of the data in parts of the unrestricted portion of data store that are not expected to be changed by the dynamically generated operations, or hash values, or version values, etc.), then it is verified that no unexpected work was performed by the dynamically generated operation(s) (act 512). This verification can optionally be returned to application 108. However, if the two snapshots are not the same, then unexpected work was performed by the dynamically generated operation(s) (act 514). Optionally, an indication of what work was performed (e.g., based on which values in the snapshot changed) may be returned to application 108 of FIG. 1, or alternatively simply an indication that some unexpected work was performed may be returned to application 108.

Returning to FIG. 3, lockset module 306 locks parts of the unrestricted portion of data store 106 so that those locked parts cannot be accessed by operation generator 104. Alternatively, lockset module 306 may lock additional parts of data store 106 rather than just parts of the unrestricted portion. In addition, it should be noted that the unrestricted portion of data store 106 may be all of data store 106 (e.g., in embodiments where there is no permission module 304, the entire data store 106 can be viewed as the unrestricted portion). Lockset module 306 is typically used for requests from application 108 that involve reading data values from data store 106.

As discussed above, the granularity of permissions supported by data store 106 may not allow all of the desired parts of data store 106 to be restricted (e.g., permissions may allow access to an entire table to be denied, but not allow granting or denying of permission on a row-by-row basis). Lockset module 306 allows locking of portions of data store 106 on a finer granularity than is allowed by the permissions supported by data store 106. Lockset module 306 identifies those parts of the unrestricted portion of data store 106 that should not be accessed by the dynamically generated operations. Application 108 informs data integrity manager 102 of what data is being requested from data store 106, allowing lockset module 306 to determine which parts of the unrestricted portion of data store 106 should not be accessed by the dynamically generated operations and lock those parts.

The parts of the unrestricted portion of data store 106 that should not be accessed by the dynamically generated operations can be identified in different manners, depending at least in part on the nature of data store 106. In certain embodiments, where data store 106 is a Microsoft® SQL server, the parts of the unrestricted portion of data store 106 that should not be accessed by the dynamically generated operations are identified by lockset module 106 selecting each row (e.g., by an identifier, such as a primary key) of the table(s) in the unrestricted portion of data store 106 that does not satisfy the request from application 108. These rows (and their identifiers) can be determined by, for example, lockset module 306 submitting operations to data store 106 to identify which rows will not satisfy the request from application 108. For each of these rows, lockset module 306 begins an update transaction on the row, but does not complete the update transaction yet. A transaction refers to a collection of operations that are guaranteed to be either all performed or none performed. A transaction is typically completed by an operation to either commit the results of all the operations in the collection, or rollback the transaction so that none of the results of the operations in the collection are committed. An update transaction is a transaction to update or modify a particular part of data store 106 (e.g. a particular row(s)). After an update transaction is begun for each row, lockset module 306 notifies application 108 that its locking process is done and that the request can be submitted to operation generator 104 so that they generator 104 can dynamically generate the operations.

A separate update transaction is begun for each of these rows in order to avoid a situation in data store 106 referred to as "lock escalation". Lock escalation occurs when data store 106 receives a transaction that accesses enough rows in a table that data store 106 concludes that it will just lock the entire table rather than trying to lock the individual rows as requested by the transaction. However, if the entire table were to be locked, then the parts of the table that should be accessed by the dynamically generated operations will not be accessible to the dynamically generated operations. So, in order to avoid lock escalation and leave the part of the table that should be accessed by the dynamically generated operations accessible to the dynamically generated operations, individual update transactions for each row are begun. Data store 106 treats these individual update transactions separately, and lock escalation will not occur. It should be noted that, in embodiments where data store 106 does not exhibit lock escalation, such individual update transactions need not be used, and a single update transaction identifying all of the rows that should not be accessed by the dynamically generated operations may be used.

By beginning, but not yet completing, an update transaction on each of the rows that does not satisfy the request from application 108, data store 106 believes that lockset module 306 is in the process of making a change to those rows. Thus, when the dynamically generated operations are performed, if any of the operations attempt to access (e.g., read) a locked part of data store 106, data store 106 will not perform that operation because that part of data store 106 is locked due to the outstanding update transaction(s). Data store 106 knows that another component (lockset module 306) is in the process of updating that part of data store 106, so data store 106 will not perform that operation because it cannot be certain what the proper value(s) is for that operation until the outstanding update transaction(s) has been completed. Data store 106 will typically timeout after a particular amount of time, and return an indication to operation generator 104 that the operation timed out and could not be performed. Operation generator 104 then returns a response to application 108 indicating that the request could not be carried out, and application 108 can infer that there was a problem with the dynamically generated operation(s).

Application 108 informs data integrity manager 102 when the dynamically generated operations have been performed, at which point lockset module 306 can release the locks it established on the rows. This release of locks can be performed, for example, by lockset module 306 informing data store 106 to release the locks and rollback the update transactions. By rolling back the transactions, no update of data is actually performed by data store 106 in response to these update transactions. This release of the locks and rolling back of the update transactions serves as the completion of the update transactions (even though none of these update transactions were committed to data store 106).

In some situations, multiple different sets of locks may be established by lockset module 306 concurrently. These different sets of locks can be established and released separately, and the update transactions that establish those locks would typically be performed over different connections to data store 106 (e.g., different unrestricted connections analogous to unrestricted connection 110 of FIG. 1).

Figure 6:
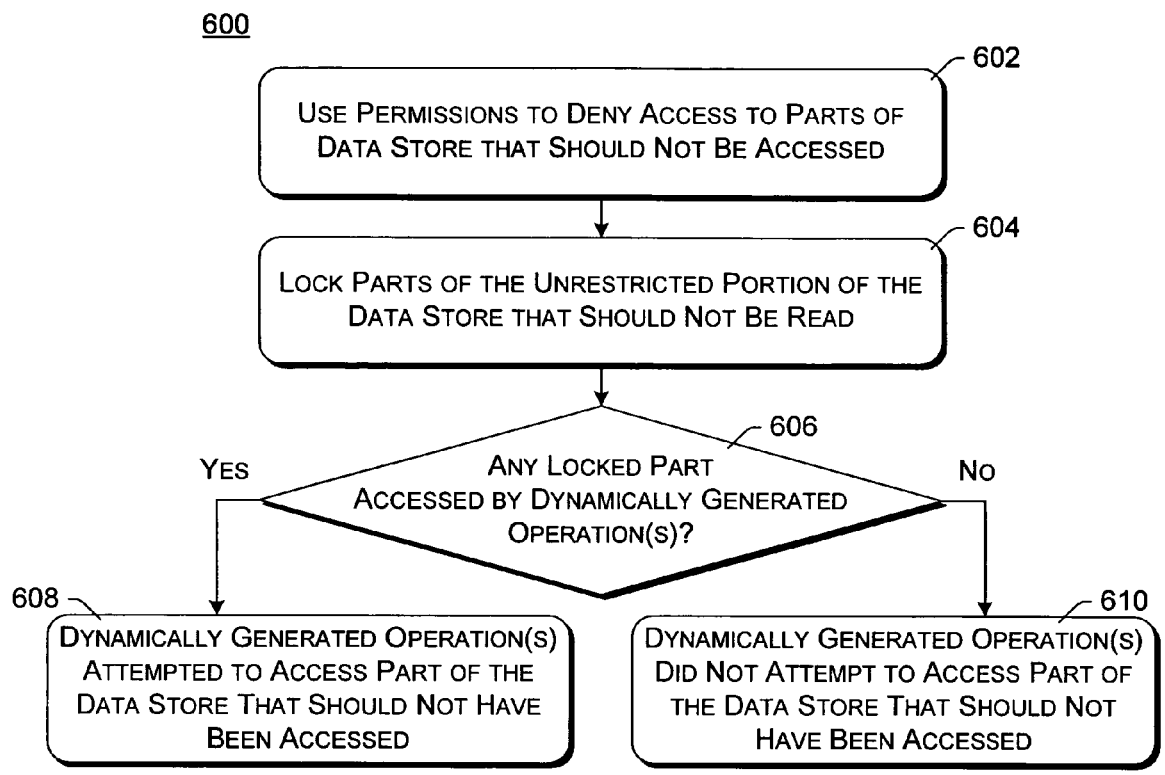
FIG. 6 is a flowchart illustrating an example process for verifying that parts of the data store that should not be accessed by the dynamically generated operations are not accessed by the dynamically generated operations.

FIG. 6 is a flowchart illustrating an example process 600 for verifying that parts of the data store that should not be accessed by the dynamically generated operations are not accessed by the dynamically generated operations. Process 600 is an example of a process that can be performed as the carrying out of setup actions act 202 and/or verification act 210 of FIG. 2. Process 600 may be performed in software, firmware, hardware, or combinations thereof.

Initially, permissions are used to deny access to parts of the data store that should not be accessed (act 602). These permissions are set, for example, by permissions module 304 of FIG. 3 as discussed above. Parts of the unrestricted portion of the data store that should not be read are then locked (act 604). This locking can be performed, for example, as discussed above with reference to lockset module 306 of FIG. 3.

After the dynamically generated operation(s) are performed (or alternatively concurrently with the dynamically generated operation(s) being performed), process 600 proceeds based on whether any locked part of the data store was accessed by the dynamically generated operation(s) (act 606). If any locked part of the data store, was accessed by the dynamically generated operation(s), then the dynamically generated operation(s) attempted to access part of the data store that should not have been accessed (act 608). Optionally, an indication the dynamically generated operation(s) attempted to access part of the data store that should not have been accessed may be returned to application 108 of FIG. 1. However, if no locked part of the data store was accessed by the dynamically generated operation(s), then the dynamically generated operation(s) did not attempt to access part of the data store that should not have been accessed (act 610). This verification can optionally be returned to application 108.

Figure 7:
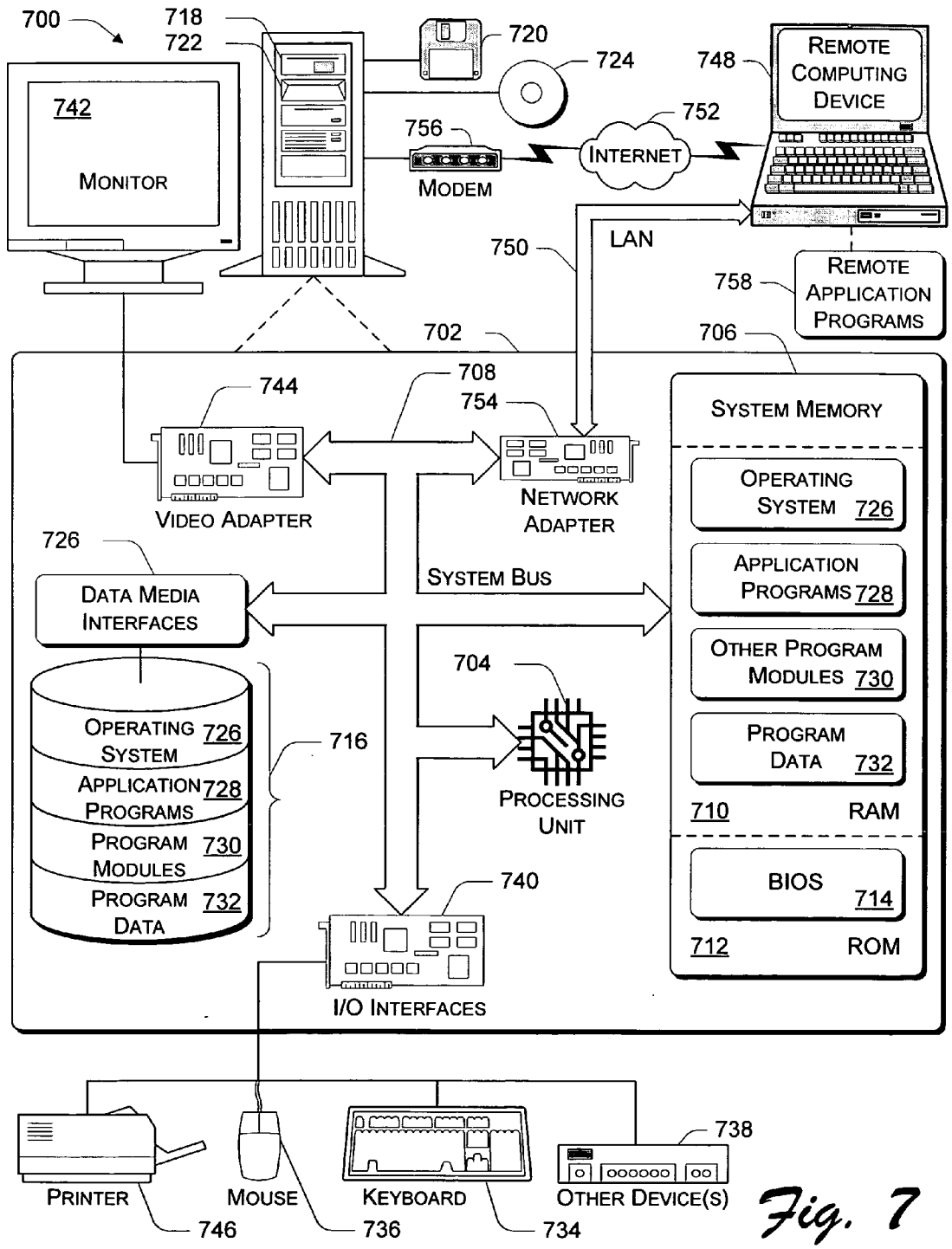
FIG. 7 illustrates a general computer environment, which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. Computer 702 can be, for example, a device on which application 108, operation generator 104, data integrity manager 102, and/or data store 106 of FIG. 1 can be implemented. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 732 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 732, and optical disk drive 722 are each connected to the system bus 708 by one or more data media interfaces 726. Alternatively, the hard disk drive 716, magnetic disk drive 732, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer storage media having stored thereon a plurality of instructions that, when executed by one or more processors of a device, causes the one or more processors to perform acts comprising:
    set permissions on a data store to allow access to only an unrestricted portion of the data store, said data store defining a structured database accessible by a structured request, by one or more dynamically generated operations that are dynamically generated based on the request, the unrestricted portion of the data store excluding a first portion of the data store that should not be accessed by the one or more dynamically generated operations;
    activate a lockset module to lock access to a pad of the data store that should not be accessed by the one or more dynamically generated operations, the part of the data store being included in the portion of the data store;
    check, after the one or more dynamically generated operations are performed, whether say unexpected changes were made to the unrestricted portion of the data store, wherein unexpected changes include changes beyond those required for each operation performed; and
    communicate, upon making a determination, an indication of whether unexpected changes were made to the unrestricted portion of the data store, wherein the communication occurs with at least an application,
    wherein the plurality of instructions further cause the one or more processors to:
        capture a first snapshot of part of the unrestricted portion before the one or more operations are performed, and
        capture a second snapshot of the part of the unrestricted portion after the one or more operations are performed;
        check whether any unexpected changes were made to the unrestricted portion by comparing the first snapshot and the second snapshot; and
        determine that unexpected changes were made to the unrestricted portion if the first snapshot and the second snapshot are not the same.

2. One or more computer storage media as recited in claim 1, wherein the unexpected changes include any addition, deletion, or modification of data in the unrestricted portion that should not have been changed in order to carry out the request.

3. One or more computer storage media as recited in claim 1, wherein the pert of the unrestricted portion comprises that part of the unrestricted portion that should not have been changed in order to carry out the request.

4. One or more computer storage media as recited in claim 1, wherein the plurality of instructions further cause the one or more processors to:
    determine that no unexpected changes were made to the unrestricted portion if the first snapshot and the second snapshot are the same.

5. One or more computer storage media as recited in claim 1, wherein the part of the unrestricted portion is dais from one or more rows of one or more tables in a database.

6. One or more computer storage media as recited in claim 5, wherein to capture the first snapshot is to copy a column of version values, wherein the version values are changed each time data in that particular row is changed, from the one or more rows before the one or more operations are performed, and to capture the second snapshot is to copy the column of version values from the one or more rows after the one or more operations are performed.

7. One or more computer storage media as recited in claim 5, wherein to capture the first snapshot is to copy a column of version values and a column of primary key values from the one or more rows before the one or more operations are performed, and to capture the second snapshot is to copy the column of version values and the column of primary key values from the one or more rows after the one or more operations are performed.

8. One or more computer storage media as recited in claim 1, wherein to check whether any unexpected changes were made to the unrestricted portion is to:

request that a notification be sent by the data store of any change made to the unrestricted portion of the data store; and analyze any notifications received from the data store to determine if any addition, deletion, or modification of data in the unrestricted portion occurred that should not have occurred to carry out the request.

9. One or more computer storage media having stored thereon a plurality of instructions that, when executed by one or more processors of a device, causes the one or more processors to perform acts comprising:

carrying out set up actions for access to a data store, said data store defining a structured database accessible by a structured request, the setup actions being based at least in part on the request for which dynamically generated operations will be generated, the carrying out comprising:

setting permissions for onions of the data store to establish a restricted portion of the data store and an unrestricted portion of the data store;

activating a module to lock access to a art of a restricted portion of the data store;

locking access to a part of the data store that should not be accessed by the one or more dynamically generated operations, the part of the data store being included in the unrestricted portion, wherein to lock access to the part of the data store is to begin one or more update transactions to the data in the locked part of the unrestricted portion of the data store, but not complete the one or more update transactions until after the one or more dynamically generated operations are performed;

verifying, after the dynamically generated operations are performed, that no unexpected work was performed by the dynamically generated operations, wherein unexpected work includes the dynamically generated operations making unexpected changes to the unrestricted portions of the data store, the dynamically generated operations attempting to access a restricted portion of the data store, or the dynamically generated operations making unexpected changes to the unrestricted portions of the data store and attempting to access a restricted portion of the data store;

determining, if no unexpected work was performed by the dynamically generated operations, that the dynamically generated operations are correct for the structured request;

determining, if any unexpected work was performed by the dynamically generated operations, that the dynamically generated operations are not correct for the structured request; and returning, to an application, results of whether the dynamically generated operations on the data store were correct.

10. One or more computer storage media as recited in claim 9, the data store comprising a database having a plurality of tables, the unrestricted portion of the data store comprising one or more of the plurality of tables, and the part of the data store comprising one or more rows of at least one of the plurality of tables in the unrestricted portion.

11. One or more computer storage media as recited in claim 9, wherein to lock access to the part of the data store is to prevent the one or more operations from accessing the part of the data store.

12. One or more computer storage media as recited in claim 9, the request comprising a request to retrieve data from the data store.

13. A method of determining whether dynamically generated operations on a data store are correct, said data store defining a structured database accessible by a structured request, the method comprising:

carrying out setup actions for access to the data store, the setup actions being based at least in part on the request for which the dynamically generated operations will be generated, the carrying out comprising:

setting permissions for portions of the data store to establish a restricted portion of the data store and an unrestricted portion of the data store;

activating a lockset module to lock access to a part of the restricted portion of the data store;

locking access to part of the unrestricted portion;

allowing a subsequent cheek of whether any unexpected changes were made to the unrestricted portion, wherein unexpected changes include changes beyond those required for the dynamically generated operation performed;

verifying, after the dynamically generated operations are performed, that no unexpected work was performed by the dynamically generated operations, wherein unexpected work includes the dynamically generated operations making unexpected changes to the unrestricted portions of the data store, the dynamically generated operations attempting to access a restricted portion of the data store, or the dynamically generated operations making unexpected changes to the unrestricted portions of the data store and attempting to access a restricted portion of the data store;

determining if no unexpected work was performed by the dynamically generated operations, that the dynamically generated operations are correct for the request;

determining; if any unexpected work was performed by the dynamically generated operations, that the dynamically generated operations are not correct for the request;

returning, to an application, results of whether the dynamically generated operations on the data store were correct; and wherein the allowing a subsequent check of whether any unexpected changes were made to the unrestricted portion comprises:

capturing a first snapshot of a first pat of the unrestricted portion before the dynamically generated operations are performed;

capturing a second snapshot of the first part of the unrestricted portion after the dynamically generated operations are performed;

comparing the first snapshot and the second snapshot;

determining that unexpected work was performed by the dynamically generated operations if the first snapshot and the second snapshot are not the same; and determining that no unexpected work was performed by the dynamically generated operations if the first snapshot and the second snapshot are the same.

14. A method as recited in claim 13, wherein the first part of the unrestricted portion comprises that part of the unrestricted portion that should not have been changed in order to carry out the request.

15. A method as recited in claim 13, wherein the first part of the unrestricted portion is data from one or more rows of one or more tables in a database.

16. A method as recited in claim 13, the allowing a subsequent check of whether any unexpected changes were made to the unrestricted portion comprising:

requesting that a notification be sent by the data store of any change made to the unrestricted portion of the data store; and analyzing any notifications received from the data store to determine if any addition, deletion, or modification of data in the unrestricted portion occurred that should not have occurred to carry out the request.

17. A method as recited in claim 13, the locking access to part of the unrestricted portion comprising:

beginning one or more update transactions to the data in the part of the data store, but not completing the one or more update transactions until after the dynamically generated operations are performed.

18. A method as recited in claim 13, further comprising allowing a subsequent check of whether any unexpected changes were made to the unrestricted portion only if the request is a request to modify the data store.

19. A method as recited in claim 13, further comprising locking access to part of the unrestricted portion only if the request is a request to retrieve data from the data store.

20. A system comprising:
a processor;
a memory coupled to the processor, wherein the memory includes;
    a snapshot module to check, after one or more dynamically generated operations, one or more dynamically generated operations being dynamically generated based on a structured request, on a data store, said data store defining a structured database accessible by the structured request, are performed, whether any unexpected changes were made to a portion of the data store wherein unexpected changes include changes beyond those required for the operation performed, wherein the snapshot module to check whether any unexpected changes were made to the portion is to:
    capture a first snapshot of a first pert of the portion before the one or more operations are performed;
    capture a second snapshot of the first part of the portion after the one or more operations are performed;
    compare the first snapshot and the second snapshot;
    determine that unexpected changes were made to the portion if the first snapshot and the second snapshot are not the same; and
    determine that no unexpected changes were made to the portion if the first snapshot and the second snapshot are the same; and
    a lockset module to lock access to a pert of the data store that should not be accessed by the one or more dynamically generated operations, the part of the data store being included in the portion of the data store.

21. A system as recited in claim 20, further comprising:
a permissions module to set permissions on the data store to allow access to only the portion of the data store, the portion of the data store excluding another portion of the data store that should not be accessed by the one or more operations.

22. A system as recited in claim 20, wherein the snapshot module is to check whether any unexpected changes were made to the portion only if the request is a request to modify the data store.

23. A system as recited in claim 20, wherein the lockset module is to lock access to the part of the data store only if the request is a request to retrieve data from the data store.

24. A system as recited in claim 20, wherein the snapshot module to check whether any unexpected changes were made to the portion is to:

request that a notification be sent by the data store when any change is made to the portion of the data store; and analyze any notifications received from the data store to determine if any addition, deletion, or modification of data in the portion occurred that should not have occurred to carry out the request.

25. A system as recited in claim 20, wherein the lockset module to lock access to a part of the data store that should not be accessed by the one or more operations is to:

begin one or more update transactions to the data in the part of the data store, but not complete the one or more update transactions until after the one or more operations are performed.

26. A system comprising:
a processor;
a memory coupled to the processor;
means for carrying out setup actions for access to a data store, said data store defining a structured database accessible by a structured request, the setup actions being based at least in part on the request for which dynamically generated operations will be generated, the means for carrying out comprising:
    means for setting permissions for portions of the data store to establish a restricted portion of the data store and an unrestricted portion of the data store;
    means for locking access to art of the restricted onion of the data store;
    means for locking access to part of the unrestricted portion or means for allowing a subsequent check of whether any unexpected changes were made to the unrestricted portion, wherein unexpected changes include changes beyond those required for the operation performed;
means for verifying, after the dynamically generated operations are performed, that no unexpected work was performed by the dynamically generated operations, wherein unexpected work includes the dynamically generated operations making unexpected changes to the unrestricted portions of the data store, the dynamically generated operations attempting to access a restricted portion of the data store, or the dynamically generated operations making unexpected changes to the unrestricted portions of the data store and attempting to access a restricted portion of the data store;
means for determining, if no unexpected work was performed by the dynamically generated operations, that the dynamically generated operations are correct for the request;
means for determining, if any unexpected work was performed by the dynamically generated operations, that the dynamically generated operations are not correct for the request;
means for returning to an application, results of whether the dynamically generated operations on the data store were correct; and
wherein the means for locking access to part of the unrestricted portion comprises: means for beginning one or more update transactions to the data in the locked part of the unrestricted portion of the data store, but not completing the one or more update transactions until after the dynamically generated operations are performed.

27. A system as recited in claim 26, the means for allowing a subsequent check of whether any unexpected changes were made to the unrestricted portion comprising:

means for capturing a first snapshot of a first part of the unrestricted portion before the dynamically generated operations are performed.

28. A system as recited in claim 27, further comprising:

means for capturing a second snapshot of the first part of the unrestricted portion after the dynamically generated operations are performed;

means for comparing the first snapshot and the second snapshot;

means for determining that unexpected work was performed by the dynamically generated operations if the first snapshot and the second snapshot are not the same; and means for determining that no unexpected work was performed by the dynamically generated operations if the first snapshot and the second snapshot are the same.

29. A system as recited in claim 26, the means for allowing a subsequent check of whether any unexpected changes were made to the unrestricted portion comprising:

means for requesting that a notification be sent by the data store of any change made to the unrestricted portion of the data store; and means for analyzing any notifications received from the data store to determine if any addition, deletion, or modification of data in the unrestricted portion occurred that should not have occurred to carry out the request.

* * * * *

UNITED STATES PATENT AND TRADEMARK OFFICE
CERTIFICATE OF CORRECTION

| | | |
|---|---|---|
| PATENT NO. | : 7,457,832 B2 | Page 1 of 1 |
| APPLICATION NO. | : 10/931075 | |
| DATED | : November 25, 2008 | |
| INVENTOR(S) | : Justin Baird et al. | |

It is certified that error appears in the above-identified patent and that said Letters Patent is hereby corrected as shown below:

In column 16, line 4, in Claim 1, delete "pad" and insert -- part --, therefor.

In column 16, line 9, in Claim 1, delete "say" and insert -- any --, therefor.

In column 16, line 37, in Claim 3, delete "pert" and insert -- part --, therefor.

In column 16, line 47, in Claim 5, delete "dais" and insert -- data --, therefor.

In column 17, line 18, in Claim 9, delete "onions" and insert -- portions --, therefor.

In column 17, line 21, in Claim 9, delete "art" and insert -- part --, therefor.

In column 18, line 16, in Claim 13, delete "cheek" and insert -- check --, therefor.

In column 18, line 32, in Claim 13, after "determining" insert -- , --.

In column 18, line 35, in Claim 13, delete "determining;" and insert -- determining, --, therefor.

In column 18, line 44, in Claim 13, delete "pat" and insert -- part --, therefor.

In column 19, line 37, in Claim 20, delete "pert" and insert -- part --, therefor.

In column 19, line 48, in Claim 20, delete "pert" and insert -- part --, therefor.

In column 20, line 26, in Claim 26, delete "art" and insert -- part --, therefor.

In column 20, line 26, in Claim 26, delete "onion" and insert -- portion --, therefor.

In column 20, line 53, in Claim 26, after "returning" insert -- , --.

Signed and Sealed this
Third Day of May, 2011

David J. Kappos
*Director of the United States Patent and Trademark Office*